US012759886B2

(12) United States Patent
Katayama et al.

(10) Patent No.: US 12,759,886 B2
(45) Date of Patent: Oct. 13, 2026

(54) METHOD FOR PRODUCING NANO-SILICON, NEGATIVE ELECTRODE ACTIVE MATERIAL FOR LITHIUM-ION BATTERIES, NEGATIVE ELECTRODE FOR LITHIUM-ION BATTERIES, AND LITHIUM-ION BATTERY

(71) Applicant: FIMATEC LTD., Tokyo (JP)

(72) Inventors: Masato Katayama, Tokyo (JP); Tomonao Umehara, Tamano (JP); Kohei Yoshida, Tokyo (JP)

(73) Assignee: FIMATEC LTD., Tokyo (JP)

( * ) Notice: Subject to any disclaimer, the term of this patent is extended or adjusted under 35 U.S.C. 154(b) by 693 days.

(21) Appl. No.: 18/247,305

(22) PCT Filed: Sep. 21, 2022

(86) PCT No.: PCT/JP2022/035121
§ 371 (c)(1),
(2) Date: Mar. 30, 2023

(87) PCT Pub. No.: WO2023/048167
PCT Pub. Date: Mar. 30, 2023

(65) Prior Publication Data

US 2023/0406715 A1 Dec. 21, 2023

(30) Foreign Application Priority Data

Sep. 21, 2021 (JP) ................................ 2021-152868

(51) Int. Cl.
*C01B 33/021* (2006.01)
*H01M 10/0525* (2010.01)

(52) U.S. Cl.
CPC ....... *C01B 33/021* (2013.01); *H01M 10/0525* (2013.01); *C01P 2002/74* (2013.01); *C01P 2004/64* (2013.01); *C01P 2006/40* (2013.01)

(58) Field of Classification Search
CPC ............... C01B 33/021; C01P 2002/74; C01P 2004/64; C01P 2006/40; H01M 10/0525
See application file for complete search history.

(56) References Cited

U.S. PATENT DOCUMENTS 10,355,272 B2 7/2019 Kim et al.
2024/0076192 A1* 3/2024 Entwistle ............. C01B 33/023

FOREIGN PATENT DOCUMENTS

CN 105905908 8/2016
JP 2007-242630 9/2007
(Continued)

OTHER PUBLICATIONS

English machine translation of CN105905908A (2016).*
(Continued)

*Primary Examiner* — Richard M Rump
(74) *Attorney, Agent, or Firm* — Grüneberg Global IP, PLLC

(57) ABSTRACT

A method for producing nano-silicon, involves (a) conducting a reduction treatment on an aluminosilicate, in which a content of $Al_2O_3$ is 3 to 40% by mass. A ratio between the number of atoms of aluminum contained in the aluminosilicate and the number of atoms of magnesium used as a reducing agent in the reduction treatment is within a range of 1:3.5 to 1:65. The method then involves (b) conducting acid treatment on a reduced aluminosilicate obtained from (a).

13 Claims, 3 Drawing Sheets

(56) References Cited

FOREIGN PATENT DOCUMENTS

| | | |
|---|---|---|
| JP | 2016-506029 | 2/2016 |
| WO | 2014/102219 | 7/2014 |

OTHER PUBLICATIONS

International Search Report issued Nov. 22, 2022, in PCT/JP2022/035121, 5 pages.
Written Opinion issued Nov. 22, 2022, in PCT/JP2022/035121, 4 pages.
Zhou et al., "Synthesis of nano-sized silicon from natural halloysite clay and its high performance as anode for lithium-ion batteries", Journal of Power Sources, vol. 324, May 21, 2016, pp. 33-40.

* cited by examiner

METHOD FOR PRODUCING NANO-SILICON, NEGATIVE ELECTRODE ACTIVE MATERIAL FOR LITHIUM-ION BATTERIES, NEGATIVE ELECTRODE FOR LITHIUM-ION BATTERIES, AND LITHIUM-ION BATTERY

CROSS-REFERENCE TO RELATED APPLICATIONS

This application is the National Stage entry under §371 of International Application No. PCT/JP2022/035121, filed on Sep. 21, 2022, and which claims the benefit of priority to Japanese Application No. 2021-152868, filed on Sep. 21, 2021. The content of each of these applications is hereby incorporated by reference in its entirety.

TECHNICAL FIELD

The present invention relates to a method for producing nano-silicon. Particularly, the present invention relates to a method for efficiently producing purified nano-silicon by causing alumina ($Al_2O_3$) in an aluminosilicate mineral to remain in a certain amount, and reducing the aluminosilicate while adjusting a ratio between the number of atoms of aluminum contained in the aluminosilicate and the number of atoms of magnesium used as a reducing agent in a reduction treatment step to within an appropriate range.

BACKGROUND ART

Although there are various methods for producing nano-silicon, as a production method using halloysite (alumina mineral), which is a nanotube mineral product, as a raw material, a method for obtaining nano-silicon, including: conducting hot acid treatment on halloysite having a specific size to cause alumina to flow out, and mixing the obtained nano-silica with NaCl or another alkali metal chloride and/or alkaline earth metal chloride as an endothermic agent and a magnesium powder as a reducing agent; heating the mixture to 600 to 1000° C. at a specific temperature increasing rate under an argon atmosphere to reduce the mixture, followed by treatment with a dilute acid, and subsequently with hydrofluoric acid is known (Patent Literature 1).

However, since in this method, unreduced nano-silica remains, and further part of nano-silicon obtained in the reduction reaction is again oxidized during the following water washing or acid treatment to become silica, this method needs the process of conducting a hydrofluoric acid treatment to cause the silica to flow out at the end.

CITATION LIST

Patent Literature

Patent Literature 1: Chinese Patent Application Publication No. 105905908

SUMMARY OF INVENTION

Problems to be Solved by the Invention

However, as a result of experiments conducted by the present inventors, in the above-described existing technique, the content of alumina after the hot acid treatment became 0% by mass, and even in the case where the content of alumina was 2% by mass, the efficiency of reducing $SiO_2$ to Si was low, and a large amount of amorphous $SiO_2$ was present. In view of this result, it is surmised that silicon obtained by the above-described existing technique also contains a large amount of amorphous $SiO_2$. In addition, the need of the treatment with hydrofluoric acid is significantly disadvantageous in terms of safety and cost.

Hence, an object of the present invention is to provide a method for producing nano-silicon with high purity which does not need a hydrofluoric acid treatment step, by suppressing generation of amorphous silica and causing alumina to remain to suppress generation of by-products such as spinel, which are compounds of aluminum, magnesium, and the like, which can be generated during reduction reaction, a negative electrode active material comprising the nano-silicon produced by the production method, a negative electrode for lithium-ion batteries, comprising the negative electrode active material, and a lithium-ion battery comprising the negative electrode.

Means for Solution of the Problems

The present inventors conducted experiments repeatedly while changing conditions, and found that it is possible to make the reduction process efficient by intentionally causing part or all of $Al_2O_3$ to remain, but not causing all $Al_2O_3$ to flow out of an aluminosilicate of the raw material mineral to obtain nano-silicon, and it thus becomes possible to stably purify nano-silicon, and it is possible to suppress generation of impurities, which are compounds of aluminum, magnesium, and the like, by adjusting the ratio between the number of atoms of aluminum contained in the aluminosilicate and the number of atoms of magnesium used as a reducing agent in the reduction treatment step to within an appropriate range, and eventually completed the present invention.

Specifically, the following inventions are provided by the present application.

1. A method for producing nano-silicon, comprising:
   - (a) a step of conducting a reduction treatment on an aluminosilicate in which a content of $Al_2O_3$ is 3 to 40% by mass in which a ratio between the number of atoms of aluminum contained in the aluminosilicate and the number of atoms of magnesium used as a reducing agent in the reduction treatment step is within a range of 1:3.5 to 1:65, and
   - (b) a step of conducting an acid treatment on a reduced aluminosilicate obtained in the step (a).
2. The production method according to the above 1, wherein the ratio between the numbers of atoms is 1:3.7 to 1:45.
3. The production method according to the above 1, wherein the ratio between the numbers of atoms is 1:3.7 to 1:30.
4. The production method according to any one of the above 1 to 3, wherein the aluminosilicate used in the step (a) is halloysite or is obtained by conducting a dealumination treatment on halloysite.
5. The production method according to any one of the above 1 to 4, wherein the aluminosilicate used in the step (a) is such that the content of $Al_2O_3$ is adjusted to 3 to 40% by mass by a dealumination treatment.
6. The production method according to the above 5, wherein the dealumination treatment comprises an acid treatment selected from the group consisting of a hot sulfuric acid treatment, a sulfuric acid treatment, a hydrochloric acid treatment, a hot hydrochloric acid treatment, a nitric acid treatment, a hot nitric acid treatment, and a combination thereof.

7. The production method according to any one of the above 1 to 6, wherein the reduced aluminosilicate obtained in the step (a) contains 6 to 39% by mass of $Al_2O_3$.
8. The production method according to any one of the above 1 to 7, wherein the reduction treatment in the step (a) comprises: mixing the aluminosilicate with a magnesium powder as the reducing agent and one or more selected from the group consisting of alkali metal chlorides and alkaline earth metal chlorides as an endothermic agent; and thermally reducing a mixture thus obtained under an argon gas or nitrogen gas atmosphere.
9. The production method according to any one of the above 1 to 8, wherein the acid treatment in the step (b) uses at least one acid selected from the group consisting of hydrochloric acid, sulfuric acid, and nitric acid.
10. The production method according to any one of the above 1 to 9, wherein the acid used in the step (b) is hydrochloric acid, and has a concentration of 0.5 to 2.0 mol/liter.
11. A method for producing nano-silicon, comprising the steps of:
obtaining an aluminosilicate in which a content of $Al_2O_3$ is 3 to 40% by mass by conducting a hot sulfuric acid treatment on an aluminosilicate, and conducting a reduction treatment on the aluminosilicate thus obtained; and
conducting an acid treatment on a reduced aluminosilicate obtained in the step.
12. A negative electrode active material for lithium-ion batteries comprising the nano-silicon obtained by the production method according to any one of the above 1 to 11.
13. A negative electrode active material for lithium-ion batteries, comprising nano-silicon in which a halo of amorphous $SiO_2$ which is observed by X-ray diffraction analysis is not present and a peak of spinel which is observed by X-ray diffraction analysis is not present, wherein a primary particle diameter of the nano-silicon which is measured by a field emission scanning electron microscope is 10 to 15 nm.
14. The negative electrode for lithium-ion batteries, comprising the negative electrode active material according to the above 12 or 13.
15. The lithium-ion battery comprising the negative electrode for lithium-ion batteries according to the above 14.

Advantageous Effects of Invention

Without being bound to any theory, the present invention makes it possible to make a reduction process efficient and stably purify silicon without causing Si, which is generated by the reduction, to be oxidized again into $SiO_2$, by reduction in two routes of bringing a commonly used reducing agent, such as Mg, into contact with not only $SiO_2$ present in an aluminosilicate but also alumina which is intentionally caused to remain to thus reduce the alumina into Al, and also using the aluminum thus obtained for reducing silica (that is, routes of using two reducing agents, that is, a first reducing agent of Mg or the like thrown in from the outside, and a second reducing agent of Al, which is generated by reduction with the first reducing agent). In addition, in the case where the amount of alumina is excessive relative to magnesium of the reducing agent, impurities such as spinel, which are compounds containing aluminum and magnesium, which cannot be removed by using acids are generated. When impurities such as spinel exist, such impurities cannot be removed by later-conducted acid treatment, and remain as impurities, which lower the purity of nano-silicon. By appropriately adjusting the ratio between the number of atoms of aluminum contained in the aluminosilicate and the number of atoms of magnesium used as a reducing agent in the reduction treatment step, an efficient reduction can be conducted, and generation of impurities such as spinel, which is generated by reaction between aluminum and magnesium, and which cannot be removed by an acid treatment, can be suppressed. It is considered that the present invention makes it possible to enhance the efficiency of reducing $SiO_2$ to Si by reducing an aluminosilicate with an appropriate ratio between aluminum and magnesium, to suppress generation of compounds of aluminum, magnesium, and the like such as amorphous silica and spinel, and thus to prevent nano-silicon obtained by the reduction from being oxidized again, thus increasing the yield of nano-silicon. The production method of the present invention makes it possible to obtain nano-silicon without conducting a hydrofluoric acid treatment step. Since the nano-silicon thus obtained has high purity, and also has a small particle diameter, the nano-silicon can be used as a negative electrode material for lithium-ion batteries which is excellent in cycle property and a lithium-ion battery comprising the same.

DESCRIPTION OF EMBODIMENTS

Figure 1:
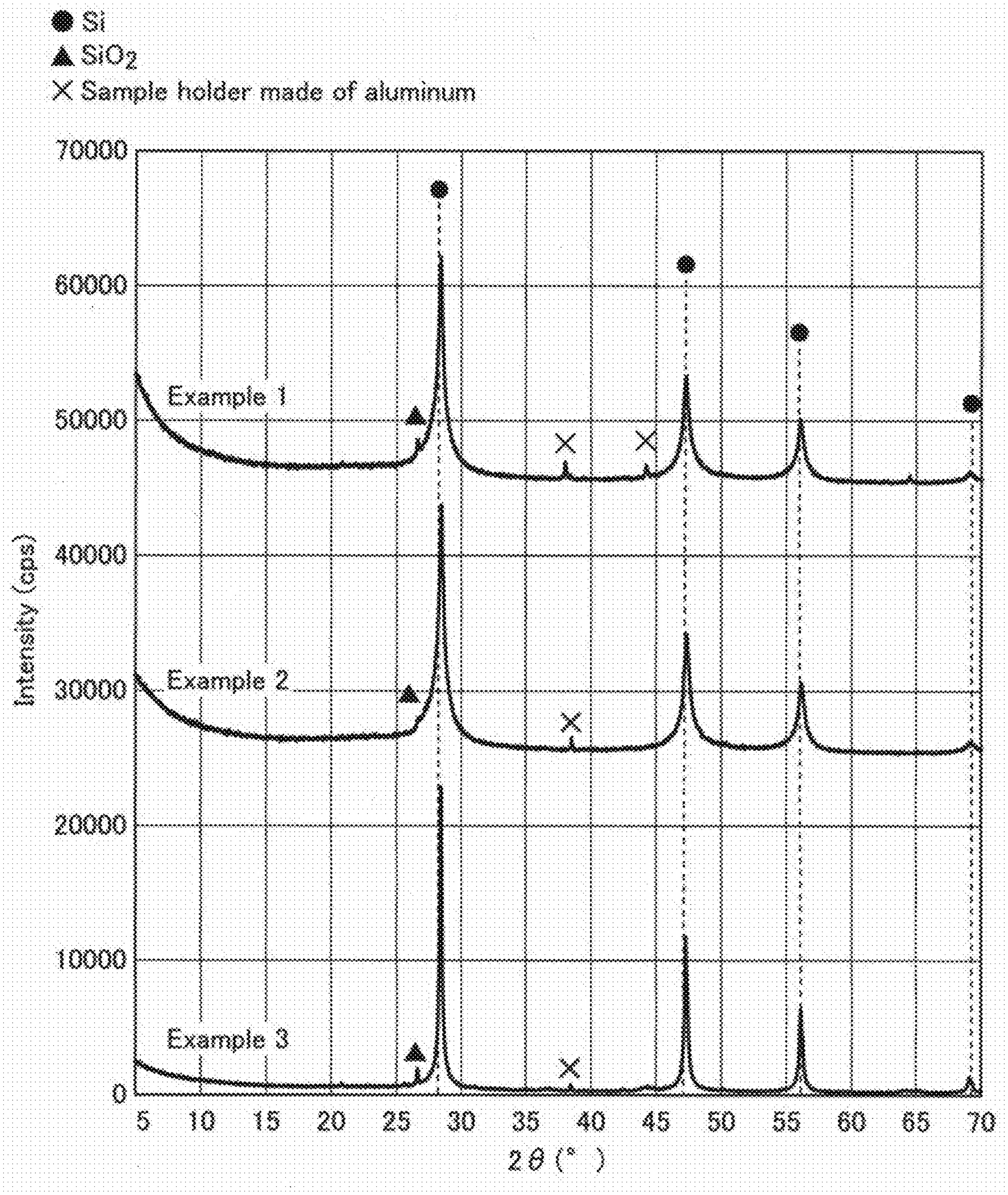
FIG. 1 is X-ray diffraction patterns of solid products obtained in Examples 1 to 3.

<Step (a): Reduction Treatment on an Aluminosilicate Containing 3 to 40% by Mass of $Al_2O_3$>

Aluminosilicates are salts produced by substitution of some of Si in silicates with Al, and represented by a general formula of $xM^{I}_2O \cdot yAl_2O_3 \cdot zSi_2 \cdot nH_2O$ (provided that there are those in which the metal is $M^{II}$, and that n may be 0 in some cases). Aluminosilicates are present in large amounts in nature as minerals such as micas, feldspars, zeolites, and clays. Among these, halloysite, which is a clay mineral, has characteristics that it has no toxicity and is highly safe. The aluminosilicate of the raw material used in the present invention is not particularly limited, but halloysite having a small primary particle diameter and a high specific surface area in nature is preferable. A high specific surface area allows the reduction treatment to be effectively conducted.

Although aluminosilicates have various structures such as chain-shaped, layer-shaped, mesh-shaped, and tube-shaped structures, an aluminosilicate formed into a powder by a jet mill, a roller mill, or the like is preferable in the present invention from the viewpoint of the easiness in reduction reaction. The average particle diameter of the aluminosilicate powder is not particularly limited, but is preferably 1 to 20 μm, and more preferably 2 to 5 μm, from the viewpoint of the easiness in reduction treatment and cost. Note that the average particle diameter of the aluminosilicate is the particle diameter of agglomerated particles, and can be measured by using a laser diffraction particle diameter distribution measurement device (for example, Mastersizer 3000 manufactured by Malvern Panalytical) using a dry powder disperser (for example. Aero S manufactured by Malvern Panalytical) under the condition of dry powder.

The aluminosilicate of the raw material of the present invention is an aluminosilicate in which the content of $Al_2O_3$ is 3 to 40% by mass. By using an aluminosilicate containing $Al_2O_3$ in an amount within such range, the efficiency in reduction, which is conducted later, is increased, and residual $SiO_2$ can be reduced. Then, oxidation of Si in an acid treatment step (b) conducted afterward can be prevented. The content of alumina is preferably 5 to 40% by mass, more preferably 6 to 39% by mass, and further preferably 6 to 20% by mass.

It is said that the content of $Al_2O_3$ originally contained in halloysite is around 35 to 40% by mass regardless of the place where the halloysite is produced. Hence, in the case where halloysite is used as the aluminosilicate of the raw material, untreated halloysite can be used as it is, or halloysite in which the content of $Al_2O_3$ has been adjusted to within the above-described preferable range by an appropriate means can be used.

The method for adjusting the content of $Al_2O_3$ in the aluminosilicate includes, for example, a dealumination treatment, and specifically, a hot sulfuric acid treatment. Specifically, the amount of $Al_2O_3$ can be controlled by adjusting the concentration of sulfuric acid, the mass ratio between sulfuric acid and the aluminosilicate, the reaction temperature, the reaction time, and the like. For example, halloysite in which the content of $Al_2O_3$ is 18% can be obtained by treating 100 g of halloysite with 1200 g of sulfuric acid having a concentration of 25% by mass at 90° C. for 4 hours. Under the same condition, the content of $Al_2O_3$ can be adjusted to 15%, 6%, and 2% when the treatment time is set to 5 hours, 7 hours, and 14 hours, respectively. After the hot sulfuric acid treatment, it is typically preferable to conduct washing with water in accordance with a conventional method. Note that when 5 g of halloysite was treated with 500 g of sulfuric acid having a concentration of 2 mol/L (17.2% by mass) at 100° C. for 10 hours in accordance with the disclosure of Example 1 in Chinese Patent Application Publication No. 105905908, the content of $Al_2O_3$ became 0%.

The dealumination treatment can be conducted by means of not only a hot sulfuric acid treatment but also a sulfuric acid treatment, a hydrochloric acid treatment, a hot hydrochloric acid treatment, a nitric acid treatment, and a hot nitric acid treatment.

In the reduction treatment, magnesium can be used as the reducing agent.

As the reducing agent, normally on the assumption that all the content other than $Al_2O_3$ in the aluminosilicate of the raw material is $SiO_2$, a magnesium powder in a molar ratio of 1 to 3 to the amount of $SiO_2$ is preferably used. In addition, the ratio between the number of atoms of aluminum contained in the aluminosilicate and the number of atoms of magnesium used as the reducing agent in the reduction treatment step is preferably 1:3.5 to 1:65, more preferably 1:3.7 to 1:45, and further preferably 1:3.7 to 1:30. If the number of atoms of magnesium used as the reducing agent in the reduction treatment step is too small relative to the number of atoms of aluminum contained in the aluminosilicate, compounds of aluminum, magnesium, and the like such as spinel which cannot be removed by using an acid are generated, while if the number of atoms of magnesium is too large, amorphous silica is generated.

Alkali metal chlorides and Alkaline earth metal chlorides act as endothermic agents. Specifically, since the reaction between $SiO_2$ in an aluminosilicate and a reducing agent, for example, Mg is exothermal reaction, Si obtained after reduction is melted by the heat of reaction to be agglomerated. In the present invention, it is possible to suppress an increase in reaction temperature and prevent the reaction temperature from exceeding the melting point of silicon by conducting the reduction treatment in the presence of an alkali metal chloride or an alkaline earth metal chloride, and as a result, it is possible to suppress agglomeration of generated silicon.

The alkali metal chlorides include NaCl, KCl, and the like. NaCl is preferable from the viewpoint of its availability and cost.

The alkaline earth metal chlorides include $CaCl_2$, $MgCl_2$, and the like. $CaCl_2$ is preferable from the viewpoint of its availability and cost.

As the endothermic agent, alkali metal chlorides are preferable from the viewpoint of their availability and costs, and among these, NaCl is preferable.

In order to effectively suppress agglomeration, it is favorable to use the endothermic agent in an amount sufficient to prevent the temperature from reaching the melting point of silicon with the heat of reaction. However, if the amount of the endothermic agent is too large, the reduction reaction becomes difficult to proceed. Hence, an appropriate amount of the endothermic agent is preferably used. For example, it is desirable to use the endothermic agent in a mass of 1 or more, and preferably 9 or more relative to the aluminosilicate of the raw material in mass ratio. Since an increase in the amount makes the reduction reaction difficult to proceed, the upper limit is preferably 12 or less in mass ratio.

It is preferable to use a magnesium powder or an aluminum powder in 1 to 3 to $SiO_2$ present in the aluminosilicate of the raw material in molar ratio and NaCl in 8 to 12 to the aluminosilicate in mass ratio in terms of the effect of the reduction treatment and cost.

The reduction treatment can be conducted by heating an aluminosilicate in which a specific amount of alumina remains in the presence of the above-described reducing agent and the above-described endothermic agent under an argon gas or nitrogen gas atmosphere.

The reduction conditions can be set as appropriate by a person skilled in the art. The above-described heating is conducted within a temperature range of, for example, 500 to 1000° C., and preferably, 500 to 800° C. The above-described heating time is, for example, 1 to 24 hours, and preferably, 2 to 6 hours. It is preferable to conduct the heating at 500 to 800° C. for a heating time of 6 hours or less, for example, around 3 hours under an argon gas atmosphere in terms of the effect of the reduction treatment and cost.

As described above, since the present invention can be considered as a method for taking out silicon by reducing an aluminosilicate mineral, the present invention can be referred to as a method for producing purified or refined nano-silicon.

After the reduction, it is typically preferable to conduct washing with water in accordance with a conventional method to remove the endothermic agent. After washing with water, the washing water may be replaced with ethanol, and thereafter ethanol may be evaporated by heating. This allows water to be removed more sufficiently.

<Step (b): Acid Treatment on the Solid Product after the Reduction Treatment>

In the present step, by-products of the reduction reaction, for example, alumina, magnesia, reaction products of these, and the like are removed.

The acid used in the present step is not particularly limited as long as it can achieve the above-described object, and for example, at least one acid selected from the group consisting of hydrochloric acid, sulfuric acid, and nitric acid can be used. Among these, hydrochloric acid is preferable because hydrochloric acid is relatively safe and neutralized salts can be easily removed by washing with water.

The concentration of the acid is preferably 0.3 to 8 mol/liter, and more preferably 0.5 to 2.0 mol/liter, from the viewpoint of the effect and safety.

Particularly, it is preferable to use hydrochloric acid at 0.5 to 2.0 mol/liter from the viewpoint that the reaction sufficiently proceeds with higher safety.

The amount of the acid is not particularly limited, but it is favorable to use the acid in an amount that allows by-products in the reduction step such as alumina and magnesia to be sufficiently dissolved.

After the acid treatment, it is typically preferable to conduct washing with water in accordance with a conventional method. After washing with water, the washing water may be replaced with ethanol, and thereafter ethanol may be evaporated by heating. This allows water to be removed more sufficiently.

[Negative Electrode Material for Lithium-Ion Batteries and Lithium-Ion Battery]

The nano-silicon of the present invention can be favorably used for a negative electrode material as a negative electrode active material for lithium-ion batteries, and can be favorably used in lithium-ion batteries containing the negative electrode material. A lithium-ion battery has a structure in which a separator for secondary batteries and an electrolyte are present between a positive electrode formed by stacking a positive electrode active material layer on a positive electrode current collector and a negative electrode formed by stacking a negative electrode active material layer on a negative electrode current collector.

It is preferable that the negative electrode for lithium-ion batteries of the present invention include: a negative electrode active material layer which contains a negative electrode active material and an electrolytic solution containing an electrolyte and a solvent: and a negative electrode current collector. The negative electrode active material layer may be composed only of the negative electrode active material of the present invention, or may be composed of the negative electrode active material of the present invention and a known negative electrode active material in combination, or in some cases may further contain a known material such as a binding material, a conductive material, or an electrolyte.

The known negative electrode active material which can be used together with the negative electrode active material of the present invention includes carbon-based materials such as graphite, hard carbon, and soft carbon. In the case of using a known negative electrode active material together, for example, when the known negative electrode active material is used in a mass ratio of the negative electrode active material of the present invention:the known negative electrode active material=1:2 to 1:30, if the proportion of the negative electrode active material of the present invention is too low, an increase in negative electrode capacity becomes low, while if the proportion is too high, a decrease in negative electrode capacity (decrease in cycle property) occurs when charge and discharge are repeated. Note that when the negative electrode active material of the present invention is carbon-coated by using sucrose or the like as a raw material, the capacity of the negative electrode active material of the present invention can be efficiently brought out. In this case, the above-described mass ratio represents a ratio between the total amount of the net mass of the negative electrode active material of the present invention and the mass of the carbon coating, and the mass of the known negative electrode active material.

The binding material includes known solvent-drying binding agents for lithium-ion batteries such as carboxymethyl cellulose, styrene-butadiene rubber latex, starch, polyvinylidene difluoride, polyvinyl alcohol, polyvinylpyrrolidone, tetrafluoroethylene, polyethylene, and polypropylene, and the like. In the case of using a binding material, the binding material is preferably used in an amount of 1/100 to 1/5 relative to the total amount of the negative electrode active material.

The conductive material includes acetylene black, graphite, ketjen black, carbon black, and the like. In the case of using a conductive material, the conductive material is preferably used in an amount of 1/100 to 1/5 relative to the total amount of the negative electrode active material.

The electrolyte includes, for example, lithium salts of inorganic anions, such as $LiPF_6$, $LiBF_4$, $LiSbF_6$, $LiAsF_6$, $LiClO_4$, and $LiN(FSO_2)_2$ and lithium salts of organic anions, such as $LiN(CF_3SO_2)_2$, $LiN(C_2F_5SO_2)_2$, and $LiC(CF_3SO_2)_3$.

The solvent includes propylene carbonate, ethylene carbonate, 1,2-dimethoxyethane, γ-butyrolactone, tetrahydrofuran, 2-methyltetrahydrofuran, 1,3-dioxolane, sulfolane, acetonitrile, diethyl carbonate, dimethyl carbonate, methylethyl carbonate, dipropyl carbonate, and the like. One solvent may be used alone or two or more solvents may be used in combination. Additives to the solvent include vinylene carbonate, fluoro vinylene carbonate, methyl vinylene carbonate, fluoromethyl vinylene carbonate, ethyl vinylene carbonate, propyl vinylene carbonate, butyl vinylene carbonate, dimethyl vinylene carbonate, diethyl vinylene carbonate, dipropyl vinylene carbonate, vinylene acetate, vinylene butylate, vinylene hexanate, vinylene crotonate, catechol carbonate, propane sultone, butane sultone, and the like. One additive may be used alone or two or more additives may be used in combination.

The nano-silicon obtained by the production method of the present invention can be used in various usages, but is favorably used as a negative electrode material for lithium-ion batteries.

Figure 3:
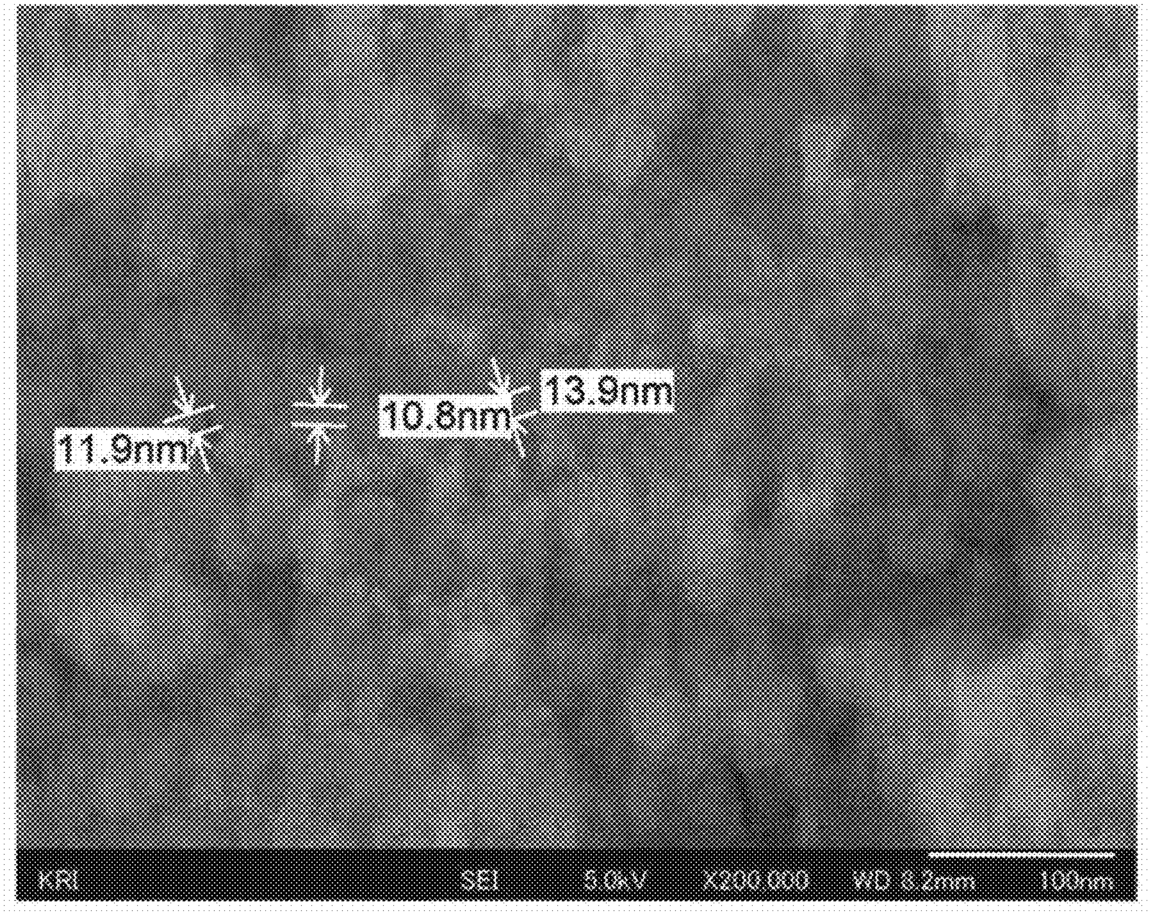
FIG. 3 is an observation picture of the solid product obtained in Example 1 using a field emission scanning electron microscope.

The nano-silicon obtained by the production method of the present invention is normally particles having a small primary particle diameter of around 10 to 15 nm, and also having a uniform particle size as shown in FIG. 3. In the nano-silicon obtained by the production method of the present invention, also a halo of amorphous $SiO_2$ which is observed by X-ray diffraction analysis is not present, and also a peak of spinel which is observed by X-ray diffraction analysis is not present. That is, the present invention makes it possible to obtain nano-silicon with high purity. In the case of using Si as a negative electrode material for a lithium-ion battery, there is a problem that the particle size of Si is reduced due to a change in volume caused by entrance and exit of lithium ions, lowering the capacity. However, when silicon particles are small, particle size reduction is unlikely to proceed due to a change in volume, and it is possible to obtain a negative electrode for lithium-ion batteries which is excellent in cycle property. When the particle size is uniform, voids among particles become large, which is advantageous in cycle property.

Note that in the Specification, "%" represents "% by mass" unless otherwise noted.

EXAMPLES

<Pretreatment 1—Hot Sulfuric Acid Treatment>

First, 1200 g of a 25% aqueous solution of sulfuric acid was heated to 90° C., and 100 g of a dry-pulverized halloysite powder (trade name DRAGONITE-HP, produced by Applied Minerals Inc., average particle diameter: 12 μm) was thrown in while stirring. A lid was placed so as not cause water to evaporate to significantly change the concentration of sulfuric acid, and reaction was conducted for 5 hours while the temperature was maintained at 90° C. with stirring.

Thereafter, a residual solid product was trapped on a paper filter by suction filtration. Distilled water was further added to the trapped solid product, suction filtration was continued, and the solid product was washed with water until the ion conductance of the filtrate became 30 μS/cm or less. In this way, sulfuric acid and water-soluble reaction products were removed from the solid product. After the solid product was dried at 120° C. for 24 hours, the solid product was pulverized by using an airflow-driven pulverizer (SJ-100CB manufactured by Nisshin Engineering Inc.) to obtain a white powder of an aluminosilicate having an average particle diameter of about 3 μm. The aluminosilicate was measured by a calibration curve method with glass bead by using an X-ray fluorescence spectrometer (ZSX PrimusII manufactured by Rigaku Corporation) in accordance with JIS R 2216: Method for X-Ray fluorescence spectrometric analysis of refractory products, and it was confirmed that the aluminosilicate contained 15% of $Al_2O_3$.

<Pretreatment 2—Hot Sulfuric Acid Treatment>

A white powder of an aluminosilicate was obtained in the same process as in Pretreatment 1 except that the reaction time was 14 hours. This aluminosilicate was measured in the same manner as in Pretreatment 1, and it was confirmed that the aluminosilicate contained 2% of $Al_2O_3$.

<Pretreatment 3—Hot Sulfuric Acid Treatment>

A white powder of an aluminosilicate was obtained in the same process as in Pretreatment 1 except that the reaction time was 7 hours. This aluminosilicate was measured in the same manner as in Pretreatment 1, and it was confirmed that the aluminosilicate contained 6% of $Al_2O_3$.

<Pretreatment 4—without Hot Sulfuric Acid Treatment>

A dry-pulverized halloysite powder (trade name DRAGONITE-HP, produced by Applied Minerals Inc., average particle diameter: 12 μm) was pulverized by using an airflow-driven pulverizer (SJ-100CB manufactured by Nisshin Engineering Inc.) without reaction of the halloysite powder with heated sulfuric acid to obtain a white powder of an aluminosilicate having an average particle diameter of about 3 μm. This aluminosilicate was measured in the same manner as in Pretreatment 1, and it was confirmed that the aluminosilicate contained 39% of $Al_2O_3$.

Example 1

(Mixing with NaCl and Drying)

To 4.88 g of the aluminosilicate prepared in Pretreatment 1, 41.48 g of NaCl and 137 mL of distilled water were mixed, followed by stirring at ordinary temperature for 1 hour. Thereafter, the solvent was evaporated with reduced pressure by using a rotary evaporator, followed by further drying at 120° C. for 12 hours.

(Mixing with Mg)

The dried product thus obtained was pulverized by using an agate mortar into a powder. From the powder thus obtained, 8.94 g was taken out, and 0.72 g of a Mg powder [$SiO_2$:Mg≈1:2.2 (mol ratio)] (calculated on the premise that all the content other than $Al_2O_3$ was $SiO_2$) was added to the powder as a reducing agent under an Ar gas atmosphere, followed by mixing. At this time, the ratio between the number of atoms of aluminum contained in the aluminosilicate and the number of atoms of magnesium used as the reducing agent in the reduction treatment step was 1:10.7.

(Reduction Reaction)

The whole amount of the mixture thus obtained was taken in an alumina crucible, which was placed in an electric furnace. Thereafter, the inside of the electric furnace was replaced with an Ar gas by reducing the pressure inside the electric furnace and then conducting Ar gas injection three times ((reduced pressure→Ar gas injection)×3). While the Ar gas was continuously kept flowing into the electric furnace, the inside was heated to 580° C. at a temperature increasing rate of 10° C./min, and then heated to 600° C. at a temperature increasing rate of 1° C./min. After the state of Ar gas flow was maintained at 600° C. for 3 hours, the temperature was lowered to 40° C., and then the Ar gas inside the electric furnace was gradually replaced with air, and the alumina crucible was taken out.

(Washing with Water)

To the solid product inside the alumina crucible thus taken out, a large amount of water was added, and an ultrasonic wave was applied to the liquid for 10 minutes, followed by centrifugation, and then the supernatant was removed. This operation (addition of water→ultrasonic wave→centrifugation) was repeated three times to remove NaCl. Thereafter, the solid product was collected on a paper filter by conducting suction filtration, ethanol was added to the solid product from above, and water present in the solid product was replaced with ethanol by conducting suction filtration. Thereafter, the solid product on the paper filter was heated at 60° C. for 3 hours under reduced pressure to remove ethanol, so that a brown solid product was obtained.

(HCl Treatment)

To 100 mL of a 1M hydrochloric acid solution, the brown solid product thus obtained was gradually thrown in. After the whole amount was thrown in, the product thus obtained was left to stand for 4 hours.

(Washing with Water)

Thereafter, a large amount of water was added, followed by centrifugation, and then the supernatant was removed. After this operation (addition of water→ultrasonic wave→centrifugation) was repeated three times, the solid product was collected on a paper filter by conducting suction filtration. Thereafter, ethanol was added to the solid product thus collected, and water present in the solid product was replaced with ethanol by conducting suction filtration. Thereafter, the solid product on the paper filter was heated at 60° C. for 3 hours under reduced pressure to remove ethanol, so that a brown solid product was obtained.

When the brown solid product thus obtained was analyzed with X-ray diffraction, a clear peak of silicon was observed (FIG. 1). A halo at around 2θ=20 to 25°, which appears when amorphous $SiO_2$ is present, was not observed. A peak of quartz which seemed to be derived from natural aluminosilicate was slightly observed. A slight peak of the sample holder made of aluminum was also observed.

Observation using a field emission scanning electron microscope (JSM-6700F manufactured by JEOL) revealed that the diameter of the primary particles of the silicon was around 10 to 15 nm (FIG. 3). When the atomic number concentrations (%) for Si, Al. O were measured by conducting SEM-EDX analysis (SEM: electron scanning microscope SU3500 manufactured by Hitachi High-Technologies Corporation, EDX: energy dispersive X-ray analyzer EMAXEvolution EX-370 X-MAX20 manufactured by Horiba, Ltd.), the atomic number concentration of residual oxygen was 21.49%. The results are shown in Table 1.

Example 2

A brown solid product was obtained in the same operation as in Example 1 except that the starting raw material was the aluminosilicate obtained in Pretreatment 3, the amount of NaCl was 46.07 g, the amount of distilled water was 148 mL, the amount of the powder obtained by pulverization after mixing with NaCl and drying was 8.85 g in the step of mixing with Mg (at this time, the ratio between the number of atoms of aluminum contained in the aluminosilicate and the number of atoms of magnesium used as the reducing agent in the reduction treatment step was 1:29.7).

When the brown solid product thus obtained was analyzed with X-ray diffraction, a clear peak of silicon was observed (FIG. 1). A halo at around 2θ=20 to 25°, which appears when amorphous $SiO_2$ is present, was not observed. A peak of quartz which seemed to be derived from natural aluminosilicate was slightly observed. A slight peak of the sample holder made of aluminum was also observed.

Example 3

A brown solid product was obtained in the same operation as in Example 1 except that the starting raw material was the aluminosilicate obtained in Pretreatment 4, the amount of NaCl was 29.96 g, the amount of distilled water was 103 mL, the amount of the powder obtained by pulverization after mixing with NaCl and drying was 9.30 g in the step of mixing with Mg, the amount of the Mg powder was 0.94 g [$SiO_2$:Mg≈1:2.90 (mol ratio)] (calculated on the premise that all the content other than $Al_2O_3$ was $SiO_2$) (at this time, the ratio between the number of atoms of aluminum contained in the aluminosilicate and the number of atoms of magnesium used as the reducing agent in the reduction treatment step was 1:3.9), and the amount of the 1M hydrochloric acid solution used in the HCl treatment step was 160 mL.

When the brown solid product thus obtained was analyzed with X-ray diffraction, a clear peak of silicon was observed (FIG. 1). A halo at around 2θ=20 to 25°, which appears when amorphous $SiO_2$ is present, was not observed. A peak of quartz which seemed to be derived from natural aluminosilicate was slightly observed. A slight peak of the sample holder made of aluminum was also observed.

Example 4

A suspension was formed by conducting disintegration process on 10.4 g of the brown solid product (nano-silicon) obtained in Example 1, 5.2 g of sucrose, 59.1 g of methanol, and 25.3 g of distilled water with a mortar. The suspension was dried at an inlet temperature of 100° C. by using a micro mist spray dryer (manufactured by GF corporation) to obtain a powder. This powder was dried at 60° C. for 2 hours under reduced pressure, and thereafter was heated at 800° C. for 2 hours in an Ar atmosphere to conduct carbon coating of the brown solid product (nano-silicon).

Then, 0.85 g of the carbon-coated brown solid product (nano-silicon) and 7.65 g of graphite were mixed such that the mass ratio of the active materials of the negative electrode material became silicon:graphite=1:9. The active material mixture thus obtained, 1.00 g of acetylene black as a conductive material, 20 g of an aqueous solution of carboxymethyl cellulose (mass percent concentration of 1%) and 0.74 g of styrene-butadiene rubber latex (mass percent concentration of 40.4) as binding materials, and 1.20 g of distilled water were mixed while stirring to obtain a suspension having a mass percent concentration of 31.8%. This suspension was applied to a Cu foil, and dried at 120° C. for 10 hours by using a vacuum dryer, and the dried product was punched into a size with a diameter of 17 mm. Using this as a working electrode (negative electrode), a fundamental evaluation cell (half cell) was formed under conditions in Table 1, and single-electrode characteristics were measured under charge and discharge conditions shown in Table 1. The single-electrode characteristics are shown in Table 3 and Table 4.

TABLE 1

| | | |
|---|---|---|
| Cell configuration | Working electrode (negative electrode) | Silicon:graphite = 1:9 |
| | Counter electrode | Li metal |
| | Reference electrode | Li metal |
| | Separator | Glass nonwoven fabric, PE microporous film |
| | Electrolytic solution | 1M-$LiPF_6$/3EC7MEC VC3% |
| Charge and discharge test conditions | Charge condition (Li insertion) | 0.2 C charge voltage 10 mV-CCCV (0.05 Ccut) |
| | Discharge condition (Li elimination) | 0.2 C cutoff voltage 2.0 V-CC |
| | Number of cycles | 10 cycles |
| | Test temperature | 25° C. |

Comparative Example 1

A brown solid product was obtained in the same operation as in Example 1 except that the starting raw material was the aluminosilicate obtained in Pretreatment 2, the amount of NaCl was 48.06 g, the amount of distilled water was 154 mL, the amount of the powder obtained by pulverization after mixing with NaCl and drying in the step of mixing with Mg was changed to 8.81 g (at this time, the ratio between the number of atoms of aluminum contained in the aluminosilicate and the number of atoms of magnesium used as the reducing agent in the reduction treatment step after mixing with Mg was 1:93.0).

Figure 2:
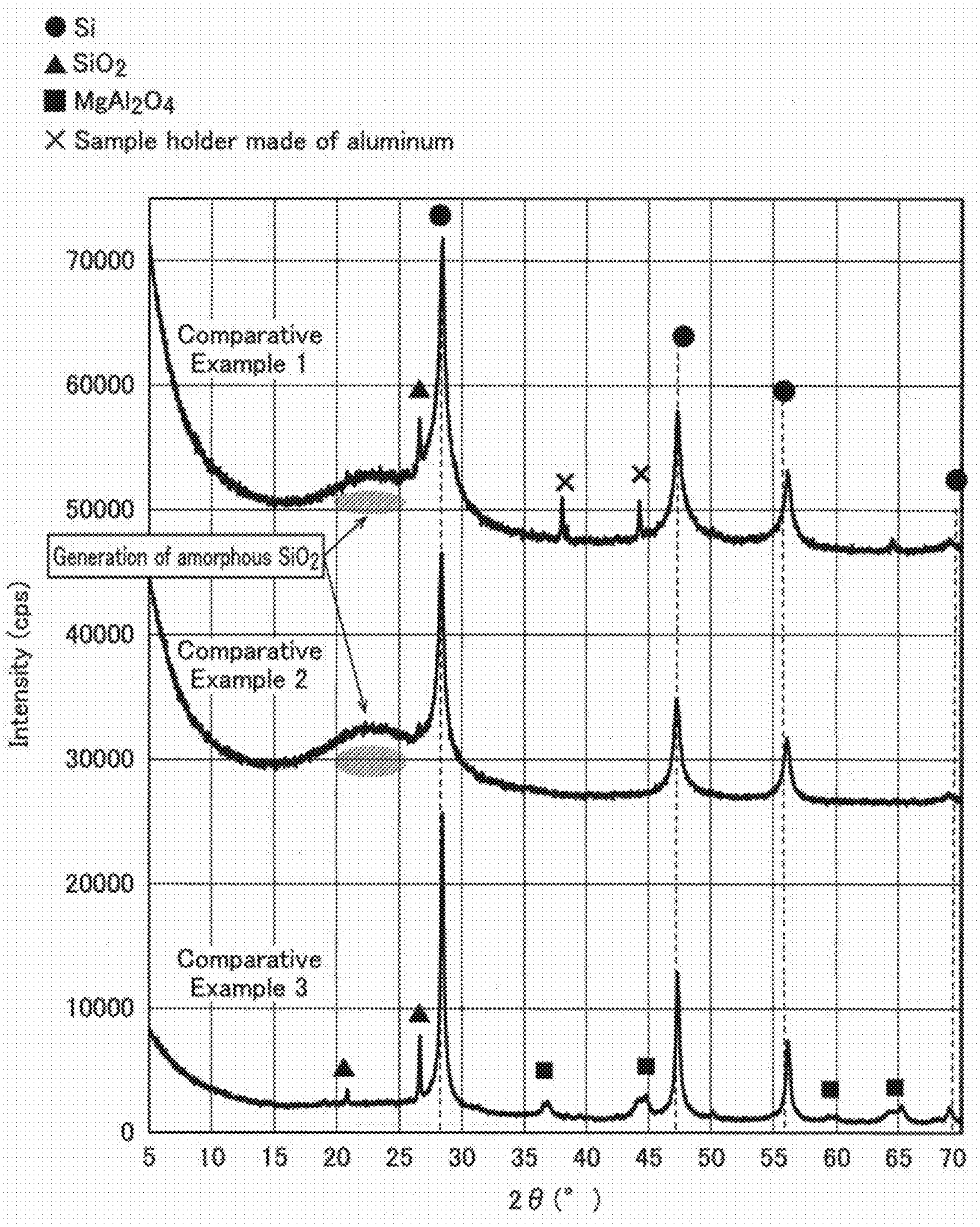
FIG. 2 is X-ray diffraction patterns of solid products obtained in Comparative Examples 1 to 3.

When the brown solid product thus obtained was analyzed with X-ray diffraction, a clear peak of silicon was observed (FIG. 2). A halo at around 2θ=20 to 25°, which appears when amorphous $SiO_2$ is present, was observed.

When the atomic number concentrations (%) for Si, Al, O were measured by conducting SEM-EDX analysis (SEM: electron scanning microscope SU3500 manufactured by Hitachi High-Technologies Corporation, EDX: energy dispersive X-ray analyzer EMAXEvolution EX-370 X-MAX20 manufactured by Horiba, Ltd.), the atomic number concentration of residual oxygen was 51.71%. The results are shown in Table 1.

Comparative Example 2

A brown powder was obtained in the same operation as in Comparative Example 1 except that the starting raw material was the aluminosilicate obtained in Pretreatment 2, and the reduction treatment time by heating at 600° C. in an Ar gas atmosphere was 24 hours. At this time, the ratio between the number of atoms of aluminum contained in the aluminosilicate and the number of atoms of magnesium used as the reducing agent in the reduction treatment step after mixing with Mg was 1:93.0.

When the brown powder thus obtained was analyzed with X-ray diffraction, a clear peak of silicon was observed (FIG. 2). A halo at around 2θ=20 to 25°, which appears when amorphous $SiO_2$ is present, was observed.

Observation using a field emission scanning electron microscope (JSM-6700F manufactured by JEOL) revealed that the diameter of the primary particles of the silicon was 20 to 60 nm. When the atomic number concentrations (%) for Si, Al, O were measured by conducting SEM-EDX analysis (SEM: electron scanning microscope SU3500 manufactured by Hitachi High-Technologies Corporation, EDX: energy dispersive X-ray analyzer EMAXEvolution EX-370 X-MAX20 manufactured by Horiba, Ltd.), the atomic number concentration of residual oxygen was 56.65%. The results are shown in Table 1.

Comparative Example 3

A brown powder was obtained in the same operation as in Example 3 except that the amount of the Mg powder added as the reducing agent in the step of mixing with Mg was 0.72 g [$SiO_2$:Mg≈1:2.2 (mol ratio)] (calculated on the premise that all the content other than $Al_2O_3$ was $SiO_2$) (at this time, the ratio between the number of atoms of aluminum contained in the aluminosilicate and the number of atoms of magnesium used as the reducing agent in the reduction treatment step after mixing with Mg was 1:3.0.)

When the brown solid product thus obtained was analyzed with X-ray diffraction, a clear peak of silicon was observed (FIG. 1). A halo at around 2θ=20 to 25°, which appears when amorphous $SiO_2$ is present, was not observed. A peak of quartz which seemed to be derived from natural aluminosilicate was observed. A peak of spinel ($MgAl_2O_4$) was also observed.

Comparative Example 4

A fundamental evaluation cell (half cell) was formed under the same conditions as in Example 4 except that silicon used for the working electrode was commercially-available carbon-coated 100-nanometer silicon, and single-electrode characteristics were measured under the charge and discharge conditions shown in Table 1. The single-electrode characteristics are shown in Table 3 and Table 4.

TABLE 3

| Single-electrode characteristics (transition of capacity) unit: mAh/g | | | | | | |
|---|---|---|---|---|---|---|
| Number of cycles | 1 | 3 | 5 | 7 | 9 | 10 |
| Example 4 | 460 | 462 | 461 | 461 | 460 | 458 |
| Comparative Example 4 | 513 | 477 | 457 | 437 | 420 | 414 |

TABLE 4

| Single-electrode characteristics (capacity maintenance ratio) | | | | | | |
|---|---|---|---|---|---|---|
| Number of cycles | 1 | 3 | 5 | 7 | 9 | 10 |
| Example 4 | 100.0% | 100.4% | 100.2% | 100.2% | 100.0% | 99.6% |
| Comparative Example 4 | 100.0% | 93.0% | 89.1% | 85.2% | 81.9% | 80.7% |

From the results of measurement of X-ray diffraction analysis shown in FIG. 2, it was confirmed that in the case where reduction treatment was conducted on the aluminosilicate in which the amount of $Al_2O_3$ was adjusted to 2% by the operation of Pretreatment 2 and the ratio between the number of atoms of aluminum contained in the aluminosilicate and the number of atoms of magnesium used as the reducing agent in the reduction treatment step was set to 1:93.0, such a large amount of amorphous $SiO_2$ that the halo of amorphous $SiO_2$ was observed was present (Comparative Examples 1, 2). While the reduction time in Example 1 was 3 hours, the reduction time in Comparative Example 2 was 24 hours. However, even when the reduction time was extended to 24 hours, the halo of amorphous $SiO_2$ was clearly observed (Comparative Example 2, FIG. 2). In addition, from the result of measurement of X-ray diffraction analysis shown in FIG. 2, in the case where reduction treatment was conducted on the aluminosilicate in which the amount of $Al_2O_3$ was adjusted to 39% by the operation of Pretreatment 4 and the ratio between the number of atoms of aluminum contained in the aluminosilicate and the number of atoms of magnesium used as the reducing agent in the reduction treatment step was set to 1:3.0, the peak of spinel ($MgAl_2O_4$) was observed (Comparative Example 3).

In contrast, in the case where reduction treatment was conducted on the aluminosilicate in which the content of $Al_2O_3$ was adjusted to 6%, 15%, 39% by the operation of Pretreatments 1, 3, 4, and the ratio between the number of

TABLE 2

| | Aluminosilicate (alumina %) | heating time @ 600° C. | Al:Mg at the reduction reaction (ratio between the numbers of atoms) | Halo of amorphous silica | Peak of spinel | Primary particle diameter | Atomic number concentrations of O, Al, Si in SEM-EDX |
|---|---|---|---|---|---|---|---|
| Example 1 | Pretreatment 1 (15%) | 3 hours | 1:10.7 | No | No | 10 to 15 nm | O = 21.49%<br>Al = 0.28%<br>Si = 78.23% |
| Example 2 | Pretreatment 3 (6%) | 3 hours | 1:29.7 | No | No | --- | --- |
| Example 3 | Pretreatment 4 (39%) | 3 hours | 1:3.9 | No | No | --- | --- |
| Comparative Example 1 | Pretreatment 2 (2%) | 3 hours | 1:93.0 | Yes | No | --- | O = 51.71%<br>Al = 0.12%<br>Si = 48.17% |
| Comparative Example 2 | Pretreatment 2 (2%) | 24 hours | 1:93.0 | Yes | No | 20 to 60 nm | O = 56.65%<br>Al = 0.09%<br>Si = 43.26% |
| Comparative Example 3 | Pretreatment 4 (39%) | 3 hours | 1:3.0 | No | Yes | --- | --- |

---: Not measured atoms of aluminum contained in the aluminosilicate and the number of atoms of magnesium used as the reducing agent in the reduction treatment step was adjusted to 1:29.7, 1:10.7, 1:3.9 (Examples 1 to 3), the halo of amorphous $SiO_2$ or the peak of spinel ($MgAl_2O_4$) was not observed with a reduction time of 3 hours (FIG. 1). Moreover, the primary particle diameter of the silicon of Example 1 was 10 to 15 nm, which was smaller than that of Comparative Example 2.

In the case of attempting to obtain silicon with high purity, in Comparative Examples 1 and 2, since amorphous $SiO_2$ was present in such a large amount that the halo of amorphous $SiO_2$ was observed in the X-ray diffraction analysis, the step of removing amorphous $SiO_2$ by using hydrofluoric acid was necessary in order to obtain silicon with high purity. Then, when the amount of aluminum becomes excessive relative to the amount of magnesium as in the case of Comparative Example 3 in which the ratio between the number of atoms of aluminum contained in the aluminosilicate and the number of atoms of magnesium used as the reducing agent in the reduction treatment step was 1:3.0, spinel ($MgAl_2O_4$), which cannot be removed even by acid treatment, is generated. However, silicon with high purity in which a halo of amorphous $SiO_2$ or a peak of spinel was not present in X-ray diffraction analysis was obtained by causing alumina to remain in an appropriate amount and conducting reduction treatment and adjusting the ratio between the number of atoms of aluminum contained in the aluminosilicate and the number of atoms of magnesium used as the reducing agent in the reduction treatment step to an appropriate range as in Examples 1 to 3. When % by mass of oxygen is calculated from the atomic number concentrations of O, Al, Si of Example 1, the % by mass is 13.49% by mass. On the assumption that the density of silicon is 2.33 and the density of $SiO_2$ is 2.3, when the primary particle diameter of nano-silicon is 10 nm, the thickness of the coating of $SiO_2$ present on the primary particles of the nano-silicon of Example 1 is about 0.5 nm. For example, even in the case where the nano-silicon of Example 1 is used as a negative electrode material for lithium-ion batteries, such thickness of $SiO_2$ does not hinder entrance and exit of lithium ions and electrons into and from the nano-silicon. Hence, the present invention makes it possible to obtain nano-silicon with high purity which can be used as a negative electrode material for lithium-ion batteries, for example, even without conducting the step of removing amorphous $SiO_2$ by using hydrofluoric acid, which is very hazardous and is also expensive.

Fundamental evaluation cells (half cells) were actually formed, and a cycle test of charge and discharge was conducted. As a result, in comparison with a lithium-ion battery (Comparative Example 4) in which a commercially-available 100-nanometer silicon was carbon-coated and then blended in a working electrode (negative electrode), although a lithium-ion battery (Example 4) in which the silicon obtained by the present invention was carbon-coated and blended in a working electrode had a smaller initial capacity than that of Comparative Example 4, which might have been because the amount of carbon coating on the silicon was larger in Example 4, but the lithium-ion battery of Example 4 was more excellent in capacity maintenance ratio in the cycle test. The battery capacity also became larger in Example after the 5th cycle. In the case of using silicon as a negative electrode material for lithium-ion batteries, there is a problem that the particle size of silicon is reduced due to a change in volume caused by entrance and exit of lithium ions, lowering the capacity. However, it was considered that since the size of silicon particles obtained in the present invention was as very small as 10 to 15 nanometers, particle size reduction was unlikely to proceed due to a change in volume, and the silicon was excellent in capacity maintenance ratio in the cycle test.

What is claimed is:

1. A method for producing nano-silicon, comprising:

providing an aluminosilicate having an $Al_2O_3$ content of 3-20 wt. %;

(a) conducting a reduction treatment on said aluminosilicate in which a ratio between the number of atoms of aluminum contained in the aluminosilicate and the number of atoms of magnesium used as a reducing agent in the reduction treatment is within a range of 1:3.5 to 1:65; and (b) conducting an acid treatment on a reduced aluminosilicate obtained in (a). wherein aluminum reduced from said $Al_2O_3$ participates in reduction of $SiO_2$.

2. The production method according to claim 1, wherein the ratio between the numbers of atoms is 1:3.7 to 1:45.

3. The production method according to claim 1, wherein the ratio between the numbers of atoms is 1:3.7 to 1:30.

4. The production method according to claim 1, wherein the aluminosilicate used in (a) is halloysite or is obtained by conducting a dealumination treatment on halloysite.

5. The production method according to claim 1, wherein the aluminosilicate used in (a) is such that the content of $Al_2O_3$ is adjusted to 3 to 20% by mass by a dealumination treatment.

6. The production method according to claim 5, wherein the dealumination treatment comprises an acid treatment selected from the group consisting of a hot sulfuric acid treatment, a sulfuric acid treatment, a hydrochloric acid treatment, a hot hydrochloric acid treatment, a nitric acid treatment, a hot nitric acid treatment, and a combination thereof, wherein each hot treatment is performed at a temperature of at least 90°° C.

7. The production method according to claim 1, wherein the reduced aluminosilicate obtained in (a) contains 6 to 20% by mass of $Al_2O_3$.

8. The production method according to claim 1, wherein the reduction treatment in (a) comprises:

mixing the aluminosilicate with a magnesium powder as the reducing agent and one or more selected from the group consisting of alkali metal chlorides and alkaline earth metal chlorides as an endothermic agent; and thermally reducing a mixture thus obtained under an argon gas or nitrogen gas atmosphere.

9. The production method according to claim 1, wherein the acid treatment in (b) uses at least one acid selected from the group consisting of hydrochloric acid, sulfuric acid, and nitric acid.

10. The production method according to claim 1, wherein an acid used in (b) is hydrochloric acid, and has a concentration of 0.5 to 2.0 mol/liter.

11. The production method according to claim 1, wherein said method does not comprise a hydrofluoric acid treatment.

12. The production method according to claim 1, wherein suppression of amorphous $SiO_2$ formation is achieved as compared with aluminosilicate having $<2$ wt. % $Al_2O_3$.

13. A method for producing nano-silicon, comprising:

obtaining an aluminosilicate in which a content of $Al_2O_3$ is 3 to 20% by mass by conducting a hot sulfuric acid treatment on an aluminosilicate, and conducting a reduction treatment on the aluminosilicate thus obtained; and conducting an acid treatment on a reduced aluminosilicate obtained in the reduction treatment, wherein said hot sulfuric acid treatment is performed at a temperature of at least 90° C.

* * * * *